United States Patent [19]
Levi et al.

[11] Patent Number: 6,137,656
[45] Date of Patent: Oct. 24, 2000

[54] AIR BEARING SLIDER

[75] Inventors: Pablo G. Levi, San Jose; Manuel Anaya-Dufresne, Fremont, both of Calif.

[73] Assignee: Read-Rite Corporation, Milpitas, Calif.

[21] Appl. No.: 09/178,588

[22] Filed: Oct. 26, 1998

[51] Int. Cl.[7] .................................................. G11B 17/32
[52] U.S. Cl. ........................................................ 360/235.4
[58] Field of Search .................................. 360/103–105, 360/235.4, 235.6, 235.7, 235.8, 235.9, 236, 236.3, 236.4, 236.5

[56] References Cited

U.S. PATENT DOCUMENTS

| | | | |
|---|---|---|---|
| 5,473,485 | 12/1995 | Leung et al. | 360/103 |
| 5,636,085 | 6/1997 | Jones et al. | 360/103 |
| 5,737,151 | 4/1998 | Bolasna et al. | 360/103 |
| 5,910,864 | 6/1999 | Hira et al. | 360/103 |

FOREIGN PATENT DOCUMENTS

| | | | |
|---|---|---|---|
| 4-67375 | 3/1992 | Japan | 360/103 |
| 4-216378 | 8/1992 | Japan | 360/103 |

Primary Examiner—Allen T. Cao
Attorney, Agent, or Firm—Nathan N. Kallman

[57] ABSTRACT

An air bearing slider for use in a disk drive includes a leading edge, a trailing edge, and parallel sides defined between said edges. The slider has a plurality of pads that form discrete air bearing surfaces having a uniform height. The pads include two leading pads formed along the leading edge, a center pad defined along the trailing edge and two side pads. A platform surrounds the center pad and another platform is formed between the leading pads. The slider has a side bridge between each side pad and leading pad and a leading bridge between the leading pads. The side bridge has a height that is less than the height of the pads and which is configured to direct air towards the side pads. The directed air in cooperation with the slider geometry regulates lifting pressure under the center and side pads to limit pitch and maintain a constant slider flying height.

16 Claims, 1 Drawing Sheet

AIR BEARING SLIDER

FIELD OF THE INVENTION

The present invention pertains to air bearing sliders for use in magnetic head assemblies and in particular to air bearing slider geometry.

BACKGROUND OF THE INVENTION

Magnetic recording heads used in disk drives typically incorporate air bearing sliders that float a head over the surface of a rotating magnetic disk. The head reads and writes data on the disk. A gimbal assembly with an actuator arm supports the slider, enabling reciprocation of the head across the disk surface. During reciprocation, the actuator arm precisely positions the head over individual data tracks of the disk.

Rotation of the disk generates airflow along the disk surface. The airflow lifts slider and head to a flying height above the disk. Close spacing between the head and the disk surface allows short wavelength, height frequency signals to be recorded, thereby affording high density, high storage capacity recording. During operation of the disk drive, it is desirable to maintain the head at a substantially constant flying height and a tightly controlled pitch relative to the disk surface.

Known air-bearing sliders include side pads or rails and some sliders include a center pad located at the trailing edge of the air bearing slider to reduce variations in slider pitch associated with rapid movement of the head actuator arm. The pads define air-bearing surfaces that build pressure to lift the air bearing slider.

The head actuator arm reciprocates along an arc, from an inside diameter of the magnetic disk to an outside diameter of the disk as the disk spins. The angle of the head arm, and thus, the angle of the air-bearing slider relative to the disk changes during head arm reciprocation. Ideally, the air-bearing slider is configured to accommodate these angular changes. However, current designs may cause the flying height to change when the angle of the head arm changes.

During rotation of the magnetic disk, the outside diameter of the disk moves over a larger distance than the inside diameter of the disk. Hence, the linear velocity of the disk relative to the air bearing surface varies, being lesser near the inside of the disk and greater near the outside of the disk. Such variations in disk linear velocity result in changes in air bearing lift forces, which may affect the flying height of the air bearing slider. Current air bearing slider designs may not achieve a constant flying height because of the changes in linear velocity of various portions of the disk. During operation of a disk drive, when a magnetic disk begins to rotate, the leading edge of the air-bearing surface pitches.

SUMMARY OF THE INVENTION

An object of this invention is to provide an air bearing slider that is characterized by minimal changes in air bearing slider flying height and pitch.

According to this invention, an air bearing slider for a hard disk drive is configured to minimize pitch and roll of the slider while maintaining a desired flying height above a rotating disk. The slider includes a leading edge, a trailing edge and parallel sides between said edges. The slider has a number of discrete pads that define air-bearing surfaces. Preferably, the pads include a pair of leading pads formed at the leading edge, a center pad defined along the trailing edge and side pads. A cavity is defined between the pads.

A feature of the invention is that the slider includes bridges extending between selected pads to regulate pressure under the pads. Preferably, a side bridge extends between each leading pad and one side pad. The slider also includes a leading bridge extending between the leading pads.

The side bridges are designed to pressurize air under the side pads and the leading bridge pressurizes air under the leading pads to optimize performance of the air bearing slider. The side and leading bridges have a generally uniform height, which is 2–13 micro-inches less than the height of the side pads.

DETAILED DESCRIPTION OF THE INVENTION

Figure 1:
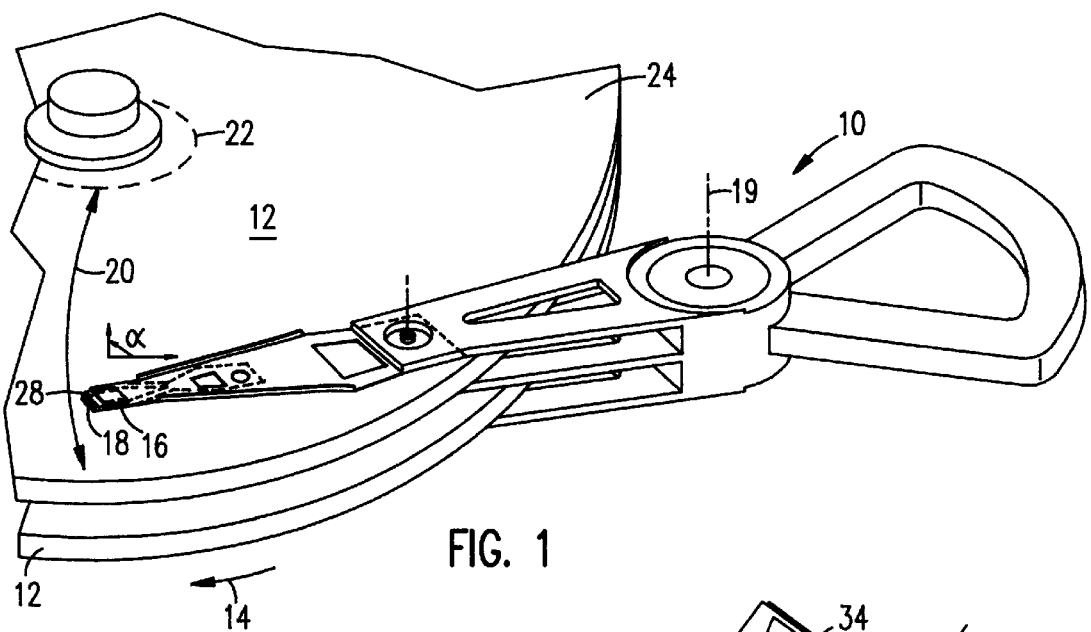
FIG. 1 is a perspective view of disks and a head actuator arm supporting an air bearing slider in accordance with the present invention.

FIG. 1 shows a head actuator arm 10 and stacked magnetic disks 12. The disks 12 rotate in the direction of the arrow 14. The actuator arm 10 includes an air bearing slider 16 and a head 18. The arm 10 reciprocates about the axis 19 to move the air bearing slider 16 along an arcuate path 20. Each disk 12 has an inside diameter 22 and an outside diameter 24. As the disk 12 rotates, the data track at the inside diameter 22 moves at a linear velocity that is relatively less than the linear velocity of the data track at the outside diameter 24. The arm 10 extends at a tangential angle a with respect to the disk 12. As the arm 20 reciprocates the air bearing slider along the arcuate path 20, the angle α changes.

Figure 2:
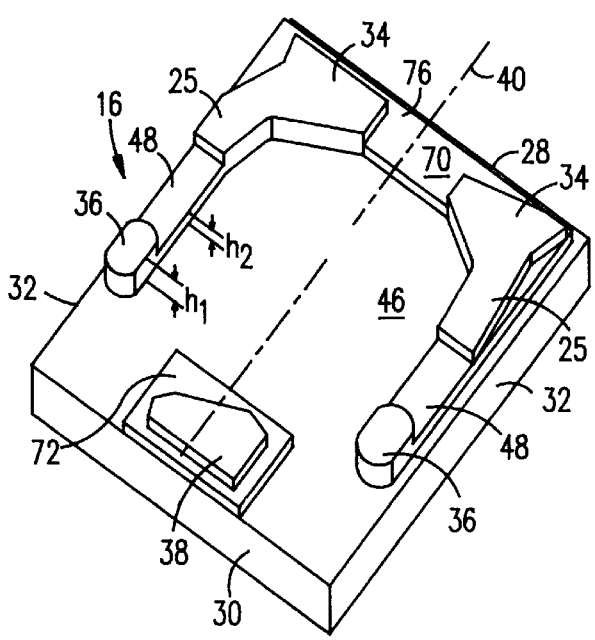
FIG. 2 is a perspective view of the air bearing slider of FIG. 1.
Figure 3:
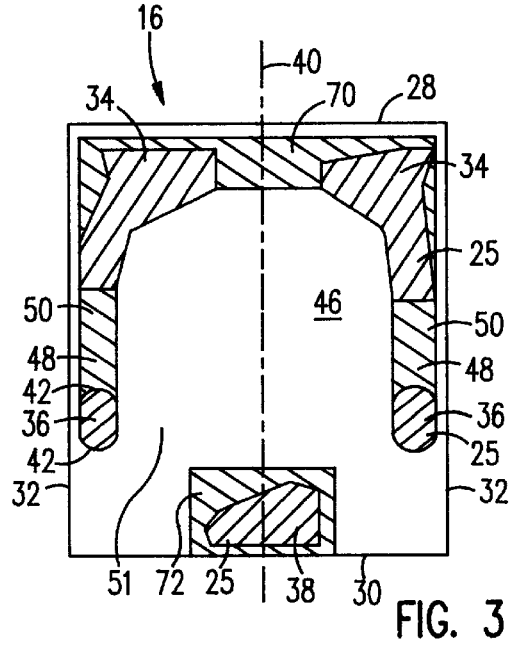
FIG. 3 is a top view of the air bearing slider of FIG. 2.

FIG. 2 and FIG. 3 show an air bearing slider 16 having a generally rectangular shape, a cavity 46, a leading edge 28, a trailing edge 30 and two sides 32. The air bearing slider 16 includes a pair of leading pads 34, a pair of side pads 36 and a center pad 38. The leading pads 34 are separated and are positioned near the leading edge 28. Each leading pad 34 extends partially towards the trailing edge 30 forming side rails.

The side pads 36 are each positioned between each leading pad 34 and the trailing edge 30. The pads 34, 36 and 38 define a discrete air-bearing surface 25 for lifting the slider 16 above the disk surface.

The air bearing slider has a longitudinal axis 40, which separates the leading pads 34. The center pad 38 is positioned adjacent the trailing edge 30 so that the axis 40 intersects the center pad 38.

The side pads 36 are positioned between the leading pads 34 and the center pad 38. The side pads 36 are aligned relative to the sides 32 and define a cavity 46. The side pads 36 have rounded edges 42 for guiding air flow. The cavity 46 has a surface 51 with a defined surface height. The side pads 36, the leading pads 34 and the center pad 38 extend vertically from the surface 51 of the cavity 46 and share a uniform height relative to the surface 51.

The pads 34, 36, and 38 are integrally formed in the cavity 46. Preferably, during manufacture, the slider 16 is etched from a single piece of material having a nominally curved air-bearing contact surface. The single piece of material is etched to form the cavity 46 and to define the pads 34, 36, and 38. Accordingly, the air bearing surfaces 25 of the pads 34, 36 and 38, which normally lift the air bearing slider 16 from the surface of a rotating disk, have a slight contour to minimize static friction between the pads and a stationary disk.

The air bearing slider 16 has a pico form factor, being rectangular in shape with dimensions of approximately 0.05 inches by 0.04 inches. The surfaces 25 of the pads 34, 36, and 38 have a uniform height ($h_1$) extending above the cavity surface 51 within the range of 40–120 micro-inches. According to one aspect of the invention, the uniform height ($h_1$) is within the range of 70–100 micro-inches. In a preferred embodiment of the invention, the uniform height is approximately 80 micro-inches, having a height tolerance of no more than two micro-inches, and preferably between 1–1.2 micro-inches.

The air bearing slider 16 includes a side bridge 48 extending along each side 32, between each side pad 36 and each leading pad 34. The side bridge 48 has a height ($h_2$) above the surface 51 of the cavity 46, which is relatively less than the uniform height ($h_1$) of the pads. Preferably, the bridge height ($h_2$) is within the range of 2–13 micro-inches less than the generally uniform height ($h_1$). In a preferred embodiment of the invention, the bridge height ($h_2$) is within the range of 5–6 micro-inches less than the uniform height ($h_1$). It can be appreciated that the ideal bridge height varies depending on disk rotational speed, air-bearing slider design and size.

A platform 70 is formed adjacent to the leading edge 28, surrounding a portion of the leading pads 34. The platform 70 forms a leading bridge 76 that extends continuously between the leading pads 34 to optimize airflow over the leading pads 34.

A platform 72 is formed adjacent to the trailing edge 30, surrounding the trailing pad 38. The platform 72 is stepped to regulate airflow over the trailing pad 38. The platforms 70 and 72 have a uniform height. Preferably, the uniform height of the platforms 70 and 72, and the height of the leading bridge 76 coincide with the bridge 48 height ($h_2$) to afford improvement in the manufacture of air bearing sliders and to optimize air flow across the air bearing sliders of this invention.

Each bridge 48 has a flat surface 50. The surfaces 50 of the bridges 48 are parallel to the cavity 46 surface 51 and lie coplanar to the platforms 70 and 72. The bridge 48 configuration is not limited to a flat surface. There are many possible bridge configurations possible, including those with tapered, or contoured surfaces 50.

The bridges 48 and the leading bridge 76 formed by the platform 70 are preferably continuous. However, the bridge 76 and the side bridges 48 may also assume a non-continuous design, having a cut or contoured portion, for example. A cut portion may extend partially, or fully to the cavity 46.

During operation, air typically flows past the leading edge 28 towards the trailing edge 30. Air also flows over the bridges 48 towards the trailing pad 30. Air flow causes the pads 34, 36 and 38 to develop positive pressure (with respect to ambient pressure) i.e. lifting force for lifting the air bearing slider 16 from a rotating disk surface. The cavity 46 is formed to develop a negative pressure (with respect to ambient pressure) to draw the air bearing slider 16 towards the disk surface. This negative pressure counteracts the lifting force developed under the pads 34, 36 and 38 to maintain the bearing slider 16 at a desired floating height above a rotating disk (FIG. 1). The various lateral bridge 48 configurations are optimally designed to cooperate with the pads 34, 36, and 38 to regulate the cavity 46 pressure, to increase pitch and roll stiffness of the air bearing slider 16 and to consistently maintain a desired flying height.

While the foregoing detailed description has described various embodiments of the invention it is to be understood that the above description is illustrative only and not limiting of the disclosed invention. For example, the configuration of each of the pads, the pad bearing surfaces and the shape of the cavity may be modified. Additionally, the dimensions of the bridges and the pads, relative to each other and relative to the cavity surface can vary and the cavity surface may be flat or curved.

What is claimed is:

1. An air bearing slider having a leading edge, a trailing edge and parallel sides defined between said edges comprising:
   a side pad adjacent to each of said sides respectively;
   a pair of leading pads positioned near the leading edge;
   a center pad near the trailing edge;
   said pads having a uniform height;
   a cavity disposed between said pads;
   a side bridge extending between each leading pad and respective side pad; and
   a leading bridge extending between the leading pads,
     wherein the height of the bridges is within the range of 2 to 13 microinches less than the uniform height of said pads.

2. An air bearing slider as set forth in claim 1, wherein the side bridges extend continuously between each leading pad and a side pad.

3. An air bearing slider as set forth in claim 1, wherein the bridges have a uniform height.

4. An air bearing slider having a leading edge, a trailing edge and two parallel sides defined between said edges comprising:
   a pair of leading pads near the leading edge;
   a center pad near the trailing edge;
   a side pad near each side, the side pads being positioned between the leading pad and the trailing edge;
   a leading bridge extending between the leading pads; and
   side bridges extending between each side pad and leading pad respectively.

5. An air bearing slider as set forth in claim 4, wherein each side bridge has a flat surface, the cavity has a flat surface, and the side bridge surface parallels the cavity surface.

6. An air bearing slider as set forth in claim 5, wherein the leading bridge has a surface, and the leading bridge surface lies coplanar with the side bridge surface.

7. An air bearing slider as set forth in claim 6, wherein the air bearing slider includes a platform surrounding the center pad, and the platform lies coplanar with the leading bridge surface and the side bridge surface.

8. An air bearing slider assembly comprising:
   a disk drive actuator arm having an air bearing slider and a magnetic head disposed on said slider;
   said slider having a leading edge, a trailing edge and two parallel sides disposed between said edges;
   a pair of leading pads near the leading edge;
   a center pad near the trailing edge;
   a side pad adjacent to each side, the side pads being positioned between the leading pad and the trailing edge; and
   a side bridge extending between each side pad and a leading pad respectively;

wherein the leading pads, the center pad and the side pads have a uniform pad height, and the bridges have a bridge height less than the uniform pad height;and including a first platform formed adjacent to the leading edge between said leading pads.

9. An air bearing slider assembly as set forth in claim 8, wherein the first platform defines a leading bridge extending continuously between the leading pads.

10. An air bearing slider assembly as set forth in claim 9, wherein the leading bridge lies coplanar with the side bridges.

11. An air bearing slider assembly as set forth in claim 9, wherein a second platform surrounds the trailing pad.

12. An air bearing slider assembly as set forth in claim 11, wherein the first platform and the second platform are coplanar.

13. An air bearing slider assembly as set forth in claim 8, wherein said pads define a cavity having a flat surface and the side bridges have a flat surface that parallels the cavity surface.

14. An air bearing slider assembly as set forth in claim 8, wherein the side bridge height is within the range of 2–13 micro-inches less than the uniform pad height.

15. An air bearing slider assembly as set forth in claim 8, wherein the uniform pad height is within the range of 40–120 micro-inches above the cavity surface.

16. An air bearing slider assembly as set forth in claim 8, wherein the uniform height of each pad is contoured, having a tolerance within the range of 1–1.2 micro-inches.

* * * * *